United States Patent
Che

(10) Patent No.: US 10,681,125 B2
(45) Date of Patent: Jun. 9, 2020

(54) SYSTEMS AND METHODS OF SUPPORTING PARALLEL PROCESSOR MESSAGE-BASED COMMUNICATIONS

(71) Applicant: Advanced Micro Devices, Inc., Sunnyvale, CA (US)

(72) Inventor: Shuai Che, Bellevue, WA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 258 days.

(21) Appl. No.: 15/084,101

(22) Filed: Mar. 29, 2016

(65) Prior Publication Data

US 2017/0289078 A1    Oct. 5, 2017

(51) Int. Cl.
G06F 15/16 (2006.01)
H04L 29/08 (2006.01)
G06F 15/80 (2006.01)

(52) U.S. Cl.
CPC ......... *H04L 67/1044* (2013.01); *G06F 15/80* (2013.01)

(58) Field of Classification Search
None
See application file for complete search history.

(56) References Cited

U.S. PATENT DOCUMENTS

| | | | | |
|---|---|---|---|---|
| 5,915,088 A * | 6/1999 | Basavaiah | ......... | G06F 15/17381 712/28 |
| 2013/0262776 A1* | 10/2013 | Asaro | ................. | G06F 12/0835 711/135 |
| 2015/0110352 A1* | 4/2015 | Csefalvay | .......... | G06K 9/00234 382/103 |
| 2016/0140084 A1* | 5/2016 | Daga | ....................... | G06F 17/16 708/207 |
| 2017/0220346 A1* | 8/2017 | Beckmann | ............ | G06F 9/3001 |
| 2017/0256016 A1* | 9/2017 | Lee | .......................... | G06F 9/544 |

OTHER PUBLICATIONS

Aji, A. et al., "MPI-ACC: An Integrated and Extensible Approach to Data Movement in Accelerator-based Systems", 2012 IEEE 14th International Conference on High Performance Computing and Communication & 2012 IEEE 9th International Conference on Embedded Software and Systems, Jun. 25-27, 2012, pp. 647-654, IEEE, Liverpool, U.K.

Wang, H. et al, "MVAPICH2-GPU: optimized GPU to GPU communication for InfiniBand clusters", Computer Science—Research and Development, Jun. 2011, pp. 257-266, vol. 26—Issue 3-4, Springer-Verlag, U.S. (first online Apr. 12, 2011).

* cited by examiner

*Primary Examiner* — Brian Whipple
*Assistant Examiner* — Gregory P Tolchinsky
(74) *Attorney, Agent, or Firm* — Volpe and Koenig, P.C.

(57) ABSTRACT

A method of message-based communication is provided which includes executing, on one or more accelerated processing units, a plurality of groups of work items, receiving a first message from a first group of work items of the plurality of groups of work items executing on the one or more accelerated processing units and storing the first message at a first segment of memory allocated to a second group of work items of the plurality of groups of work items executing on the accelerated processing unit.

18 Claims, 7 Drawing Sheets

SYSTEMS AND METHODS OF SUPPORTING PARALLEL PROCESSOR MESSAGE-BASED COMMUNICATIONS

TECHNICAL FIELD

The disclosure is generally directed to message based communications in an accelerated parallel processor, such as a graphics processing unit (GPU), and in particular, to sending messages between groups of work items using portions of memory allocated to each of the groups of work items.

BACKGROUND

Conventional computer architectures include central processing units (CPUs) optimized to serially process single tasks quickly and accelerated parallel processors, such as graphics processing units (GPUs) having a large number of cores optimized to process many tasks in parallel.

Message passing is utilized as a form of parallel communication between different sequences of programmed instructions (e.g., threads) of a program or application. In some applications, such as graph and network applications, data structures for these communications may be represented by messages.

Some computer architectures include CPU clusters (multiple CPUs) and programming models which pass messages between the CPUs. Conventional GPU programming models include Open Computing Language (OpenCL) and Compute Unified Device Architecture (CUDA)). For multi-node applications using GPUs, some conventional models use hybrid techniques, such as combining a Message Passing Interface (MPI) with an accelerator model. For example, hybrid models include combining MPI with CUDA and combining MPI with OpenCL (e.g., where each machine node includes a central processing unit (CPU) and an accelerator (e.g., GPU or accelerated processing unit (APU)).

BRIEF DESCRIPTION OF THE DRAWINGS

A more detailed understanding may be had from the following description, given by way of example in conjunction with the accompanying drawings wherein.

DETAILED DESCRIPTION

Figure 1:
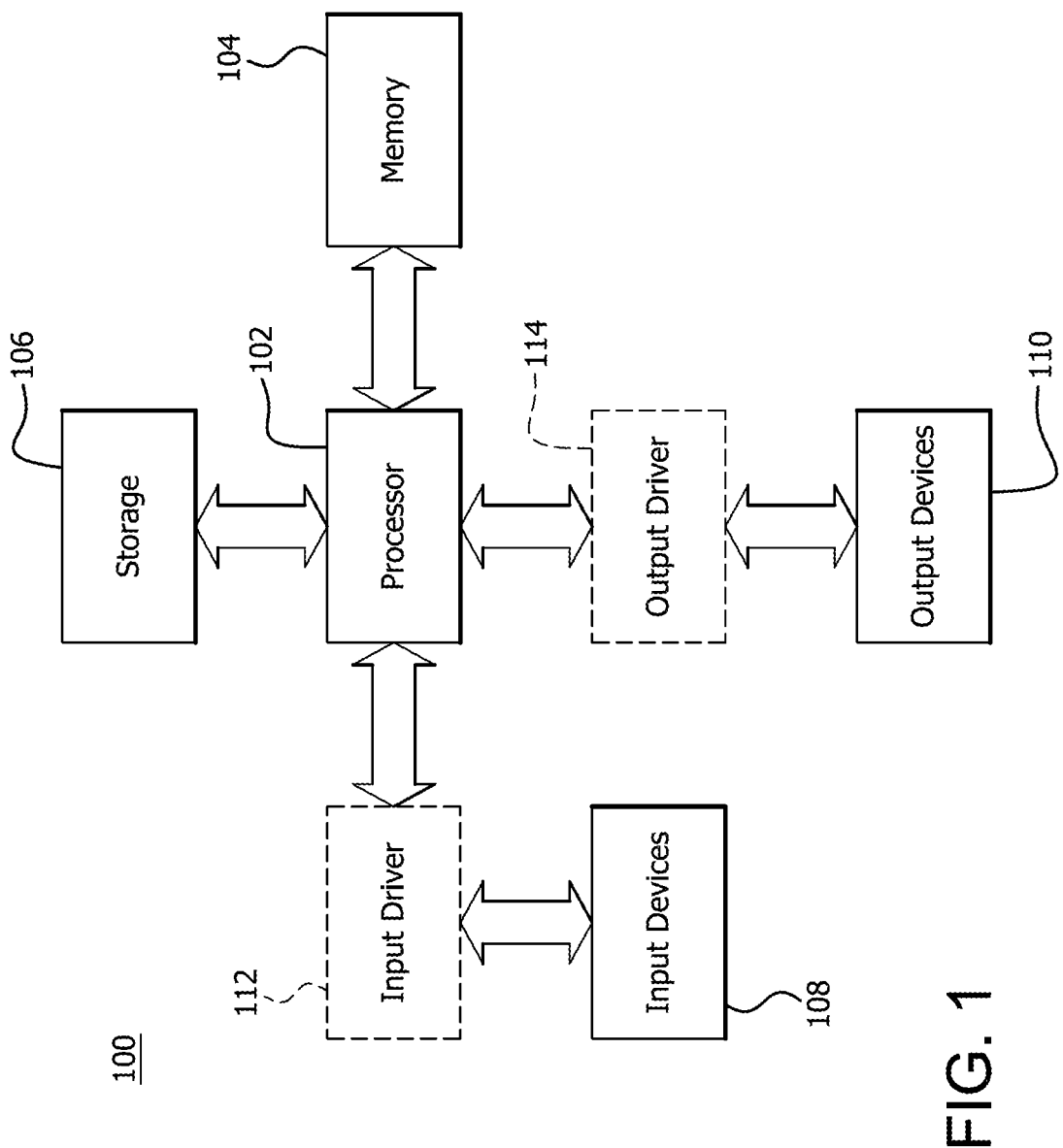
FIG. 1 is a block diagram of an example device in which message based communications may be implemented.

A method of message-based communication is provided that comprises executing, on one or more accelerated processing units, a plurality of groups of work items, receiving a first message from a first group of work items of the plurality of groups of work items executing on the one or more accelerated processing units and storing the first message at a first segment of memory allocated to a second group of work items of the plurality of groups of work items executing on the accelerated processing unit.

The first message may be received from a portion of memory allocated to the first group of work items of the plurality of groups of work items executing on the accelerated processing unit.

The method may further comprise determining an updatable end of the memory allocated to the second group of work items, storing, at the first segment, the first message beginning at the updatable end of the memory allocated to the second group of work items and updating the updatable end of the memory as a first updated end based on the updatable end and a size of the first message.

The method may further comprise receiving a second message from a portion of memory allocated to a third group of work items of the plurality of groups of work items executing on the accelerated processing unit, determining, by the second group of work items, the first updated end of the memory allocated to the second group of work items, storing, at a second segment of the memory allocated to the second group of work items, the second message beginning at the first updated end and updating the first updated end of the memory as a second updated end based on the first updated end and a size of the second message.

The method may further comprise storing data identifying: (i) the first group of work items sending the first message, the first segment in the memory and the size of the first message stored at the first segment; and (ii) data identifying: the third group of work items sending the second message; the second segment in the memory; and the size of the second message stored at the second segment.

The method may further comprise determining the updatable end of the memory by fetching the updatable end of the memory allocated to the second group of work items, reserving the first segment based on the updatable end of the memory and the size of the first message and storing the first message at the reserved first segment.

The method may further comprise at least one of preventing, via a first barrier, the first message or the second message from being consumed by the second group of work items until the first message and second messages are received and preventing, via a second barrier, the receiving of one of the first message and the second message until the other of the first message and the second message is also received.

The first group of work items, the second group of work items and third group of work items may be wavefronts, and at least one of the first barrier and the second barrier is: (i) a workgroup barrier where each of the first group of work items, the second group of work items and third group of work items are wavefronts within the same workgroup; and (ii) a global barrier where each of the first group of work items, the second group of work items and third group of work items are wavefronts in different workgroups sharing the same global memory.

The method may further comprise allocating separate portions of memory to each of the plurality of work item groups and each of the separate segments of memory may be used to store one or more messages sent from one or more other work item groups of the plurality of work item groups.

A processor device is provided that comprises one or more accelerated processing units executing a plurality of work item groups each comprising a plurality of work items and memory having a first portion allocated to a first one of the plurality of work item groups. The first memory portion is configured to receive, at a first segment, a first message from a second one of the plurality of work item groups, the second work item group being different from the first work item group.

The first memory portion allocated to the first one of the plurality of work item groups may be further configured to receive the first message from a second memory portion allocated to the second one of the plurality of work item groups.

The one or more accelerated processing units may be configured to determine an updatable end of the first portion of memory allocated to the first one of the plurality of work item groups, store, at the first segment, the first message beginning at the updatable end of the portion of memory allocated to the first one of the plurality of work item groups and update the updatable end of the first portion of memory as a first updated end based on the updatable end of the first portion of memory and a size of the first message.

The one or more accelerated processing units may be configured to receive a second message from a third portion of memory allocated to a third group of work items executing on the one or more accelerated processing units, determine the first updated end of the portion of memory allocated to the first one of the plurality of work item groups, store, at a second segment of the first portion of memory allocated to the first one of the plurality of work item groups, the second message beginning at the first updated end and update the first updated end of the first portion of memory allocated to the first one of the plurality of work item groups as a second updated end based on the first updated end of the portion of memory and a size of the second message.

The one or more accelerated processing units may be further configured to store data identifying: (i) the first group of work items sending the first message, the first segment in the first portion of memory allocated to the first one of the plurality of work item groups and the size of the first message stored at the first segment; and (ii) data identifying the third group of work items sending the second message, the second segment in the first portion of memory allocated to the first one of the plurality of work item groups and the size of the second message stored at the second segment.

The one or more accelerated processing units may be further configured to determine the updatable end of the first portion of memory allocated to the first one of the plurality of work item groups by fetching the end of the first portion of memory allocated to the first one of the plurality of work item groups, reserve the first segment based on the updatable end of the first portion of memory allocated to the first one of the plurality of work item groups and the size of the first message and store the first message at the reserved first segment.

The one or more accelerated processing units may be further configured to at least one of: prevent, via a first barrier, the first message or the second message from being consumed by the second group of work items until the first message and second messages are received; and prevent, via a second barrier, the receiving of one of the first message and the second message until the other of the first message and the second message is also received.

The first group of work items, the second group of work items and third group of work items may be wavefronts and at least one of the first barrier and the second barrier is: (i) a workgroup barrier where each of the first group of work items, the second group of work items and third group of work items are wavefronts within the same workgroup; and (ii) a global barrier where each of the first group of work items, the second group of work items and third group of work items are wavefronts in different workgroups sharing the same global memory.

A tangible, non-transitory computer readable medium is provided that comprises instructions for causing a computer to execute a method of message-based communication. The instructions comprise executing, on one or more accelerated processing units, a plurality of groups of work items, receiving a first message from a first group of work items of the plurality of groups of work items executing on the one or more accelerated processing units and storing the first message at a first segment of memory allocated to a second group of work items of the plurality of groups of work items executing on the one or more accelerated processing units.

The instructions may further comprise determining an updatable end of the memory allocated to the second group of work items, storing, at the first segment, the first message beginning at the updatable end of the memory allocated to the second group of work items and updating the updatable end of the memory as a first updated end based on the updatable end and a size of the first message.

The instructions may further comprise receiving a second message from a portion of memory allocated to a third group of work items of the plurality of groups of work items executing on the accelerated processing unit, determining, by the second group of work items, the first updated end of the memory allocated to the second group of work items and storing, at a second segment of the memory allocated to the second group of work items, the second message beginning at the first updated end; and updating the first updated end of the memory as a second updated end based on the first updated end and a size of the second message.

Conventional programming models include message passing across clusters of CPUs or across CPU-GPU nodes, which target the optimization of cross-node or cross-CPU/GPU data communications. Further, these conventional models include restructuring of message-passing CPU applications and are manually adapted (e.g., by programmers) to parallel processing models, such as GPU parallel processing models.

This disclosure provides message based communications between groups of work items (e.g., wavefronts) executing on one or more accelerated processors, such as a GPU. For example, messages are passed between sequences of programmed instructions (e.g., a wavefront, a workgroup) that can be managed independently by a scheduler (e.g., a unit of scheduling for a GPU).

Message based communications described herein utilize barriers, such as workgroup barriers or global barriers, to synchronize operations and prevent second data (e.g., data from an additional workgroup) from being received until first data (e.g., data from a first workgroup) is finished being received. Message based communications may include message passing between wavefronts on the same GPU core or between multiple GPU cores.

Message based communications disclosed herein may include different sequences of instructions (e.g., programmed instructions) executed on a CPU or an accelerated processor, such as a GPU, to perform any one of a variety of tasks, such as computations, functions, processes and jobs. For simplification of explanation, terms used herein to describe the different sequence of instructions include a work item or thread, a group of work items, such as a wavefront and a work group that includes a plurality of wavefronts. The terms used herein to describe the different sequence of instructions are exemplary. Other terms may also be used to describe different sequences of programmed instructions.

FIG. 1 is a block diagram of an example device 100 in which message based communications may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
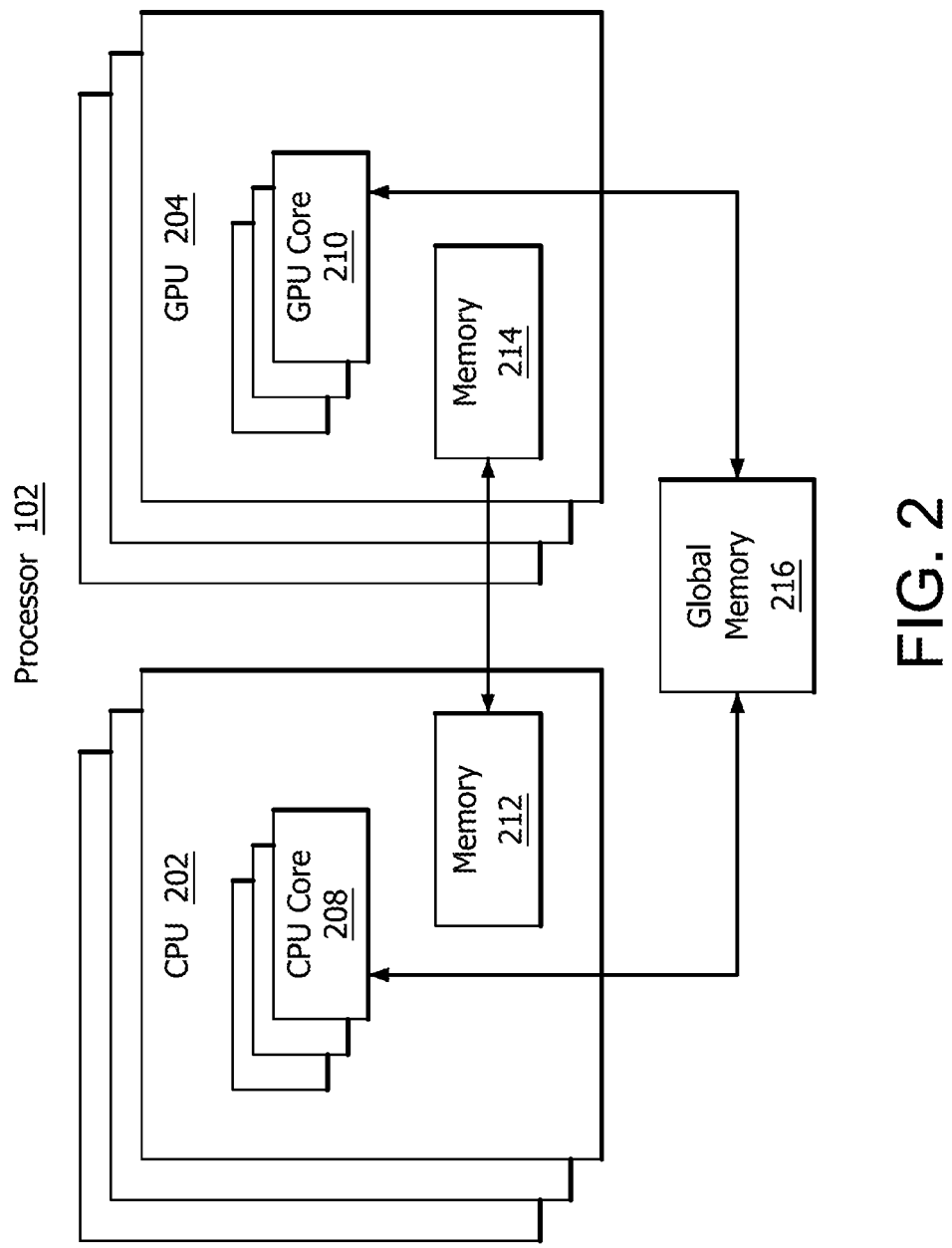
FIG. 2 is a block diagram of the exemplary processor shown in FIG. 1.

FIG. 2 is a block diagram of the exemplary processor 102 shown in FIG. 1. Processor 102 may include one or more processors of a first type. For example, as shown in FIG. 2, one or more processors of a first type may include a CPU 202. Processors of a first type may also include one or more CPU cores, such as one or more CPU cores 208. Processor 102 may also include one or more processors of a second type, such as a GPU or APU. For example, as shown in FIG. 2, one or more processors of a second type may include GPU 204. Processors of a second type may also include one or more GPU cores or compute units (CU), such as GPU cores 210.

One or more CPUs 202 and one or more GPUs 204 may be located on the same die, or multiple dies. The GPU cores 210 may be organized into groups with a processing control (not illustrated) controlling a group of GPU cores 210. A processing control may control a group of GPU cores 210 such that the group performs as single instruction multiple data (SIMD) processing units (not illustrated).

The CPU 202 may include memory 212. Memory 212 may be shared by any number of the CPU cores 208. The GPU 204 may also include memory 214. Memory 214 may be shared by any number of the GPU cores 210. While memory 212 is not visible to GPU cores 210 and memory 214 is not visible to CPU cores 208, data may be transferred between the memory 212 and memory 214. A global memory 216 may be visible and used by both the CPU 202 and the GPU 204. Each of the one or more CPUs 202 and GPUs 204 may include any number of memories in addition to or in place of or as part of memory 212 and memory 214, such as memory (not shown) for each of the CPU cores 208, memory (not shown) for each of the GPU cores 210. Data may be transferred using a high-bandwidth bus (not shown) or using shared memory with unified address space (not shown).

Each of the CPUs 202 may be configured to serially (sequentially), or in parallel, execute single tasks, such as work items or threads, of a plurality of tasks of a program and each of the GPUs 204 may be configured to execute a group of work items in parallel, such as parallel execution of wavefronts or work groups each having a plurality of wavefronts.

Figure 3:
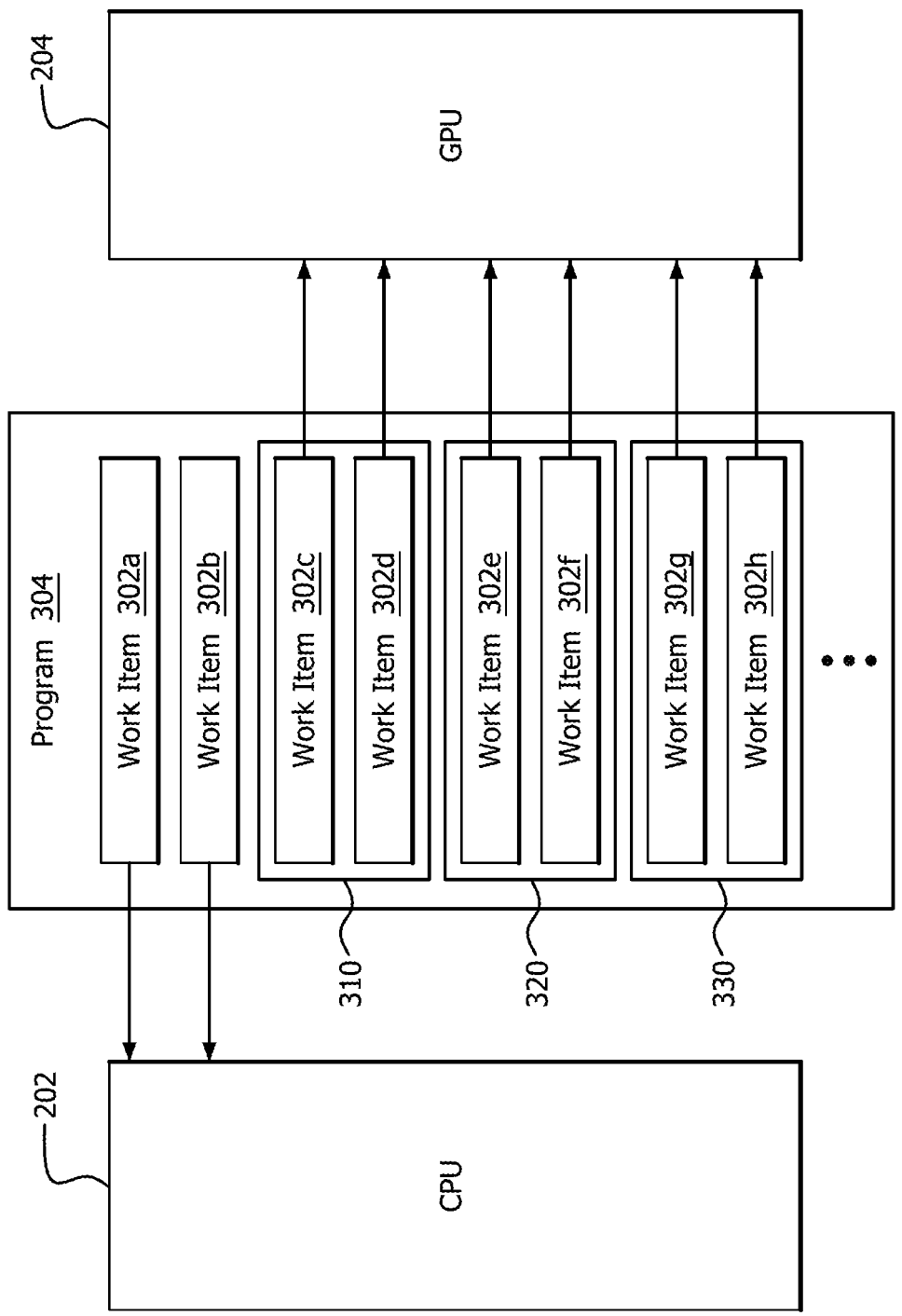
FIG. 3 is a system flow diagram illustrating exemplary work items of a portion of a program executing in CPU and GPU for use with message based communications disclosed herein.

FIG. 3 is a system flow diagram illustrating exemplary work items 302 of a portion of a program 304 executing in CPU 202 and GPU 204. Work items 302a through 302g represent tasks of a program to be executed in CPU 202 and GPU 204. As shown in FIG. 3, some work items 302 are executed in CPU 202 while others are executed in GPU 204. For example, work items 302a and 302b are executed in CPU 202, which is optimized to serially execute each work item, or small number of work items in parallel, efficiently. Other work items (e.g., work items 302c to 302h) are executed in GPU 204, which is optimized to execute many work items in parallel. The number of work items 302 shown in FIG. 3 is merely exemplary. Any number of work items may be executed in a CPU or a GPU. For example, a portion of a program may include many more (e.g., hundreds) work items being processed in parallel to complete a portion of the program. The order of the work items 302 being processed in CPU 202 and GPU 204 in FIG. 3 is also exemplary. Work items of a program may be processed in any order based on different factors.

As shown at FIG. 3, work items 302 may be part of wavefronts 310, 320 and 330 to be executed in GPU 204. For simplification of explanation, FIG. 3 illustrates three wavefronts 310, 320 and 330 each including two work items 302. Any number of wavefronts, each having any number of work items 302, may be used.

Figure 4:
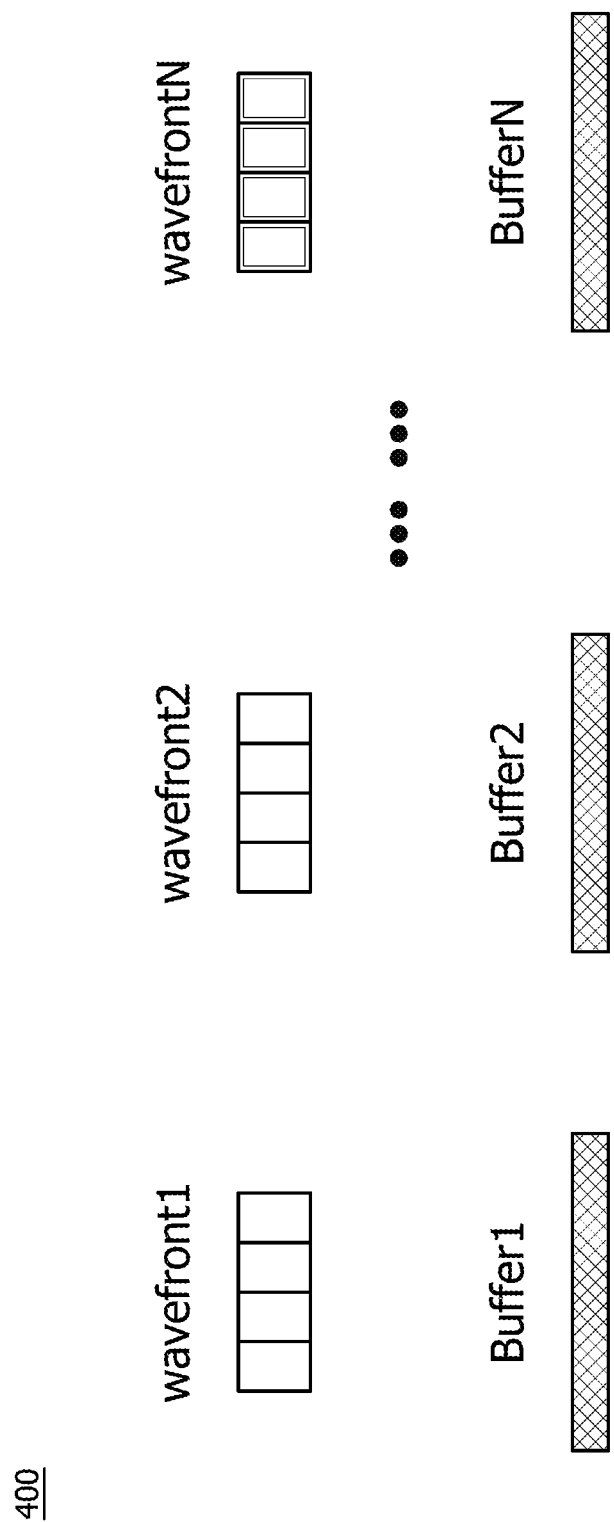
FIG. 4 is a diagram illustrating a plurality of wavefronts each having a corresponding wavefront buffer according to message based communications described herein.

FIG. 4 is a diagram 400 illustrating a plurality of wavefronts (wavefront 1, wavefront 2, . . . wavefront N) each having a corresponding wavefront buffer (buffer 1, buffer 2, buffer N). As shown in FIG. 4, each wavefront 1 through N includes a single corresponding buffer 1 through N. Wavefronts may, however, have any number of corresponding wavefront buffers. Wavefront buffers 1 through N may be a portion of different memory types, such as for example a global memory (e.g., global memory 216), a local memory (e.g., memory 214), a memory (not shown) local to a GPU core, or a memory dedicated to wavefront buffers (not shown). A register memory architecture may be used to send messages via memory, as well as registers (not shown).

Each wavefront buffer (buffer 1, buffer 2, buffer N) may be used by its corresponding wavefront (wavefront 1, wavefront 2, . . . wavefront N) to execute a plurality of work items, in an accelerated processor, such as a GPU. For example, wavefront 1 may use buffer 1 and wavefront 2 may use buffer 2 to execute a plurality of work items. A portion of a wavefront buffer (buffer 1, buffer 2, buffer N) used by a wavefront (e.g., a destination wavefront) may also be reserved by another wavefront (e.g., a source wavefront) for sending a message from the source wavefront to the destination wavefront. A wavefront may, at different times, send messages to one or more other wavefronts and receive messages from one or more other wavefronts.

Figure 5:
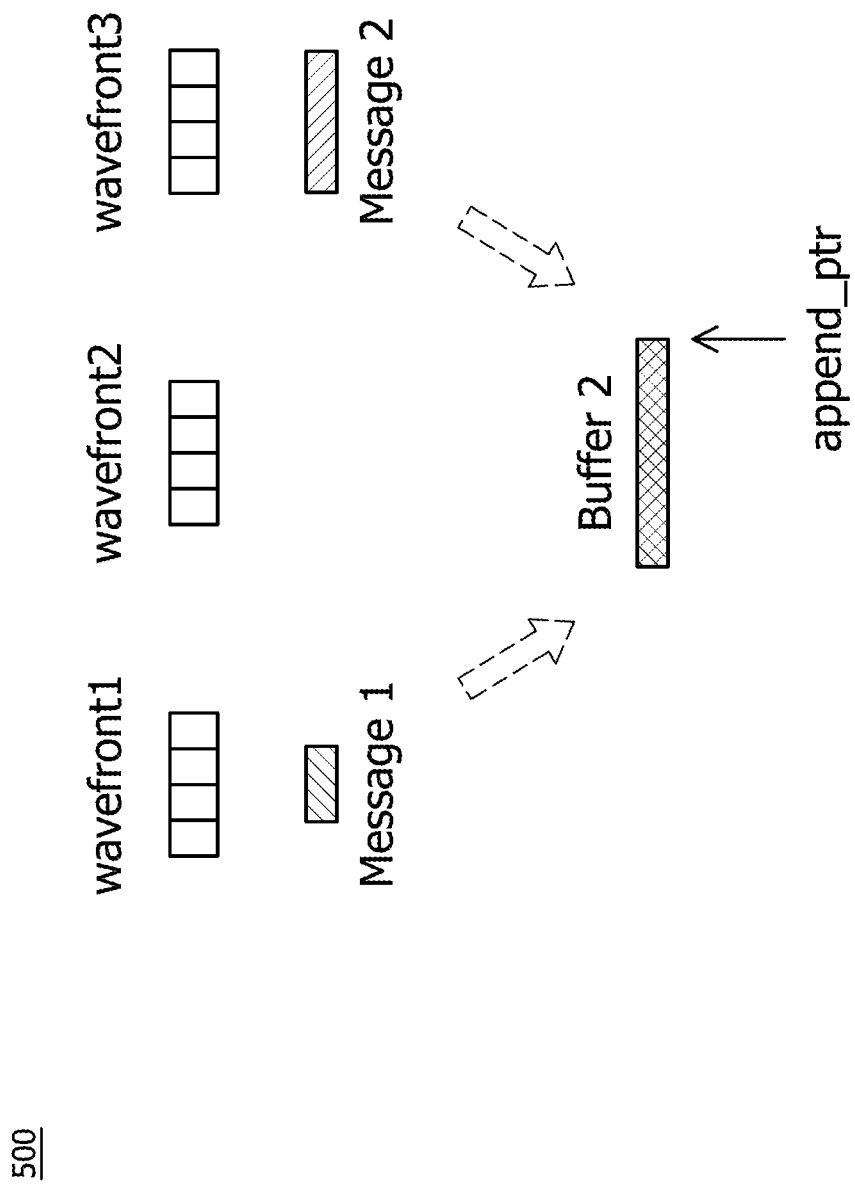
FIG. 5 is an illustration showing exemplary message passing between a plurality of wavefronts executing on an accelerated processor according to message based communications described herein.

FIG. 5 is an illustration 500 showing exemplary message passing between a plurality of wavefronts (wavefront 1, wavefront 2 and wavefront 3) executing on an accelerated processor, such as a GPU 204. As shown in FIG. 5, wavefront 1 sends message 1 to wavefront buffer 2, which is an example of a portion of memory allocated to wavefront 2. Wavefront 3 also sends a message 2 to wavefront buffer 2.

Figure 6:
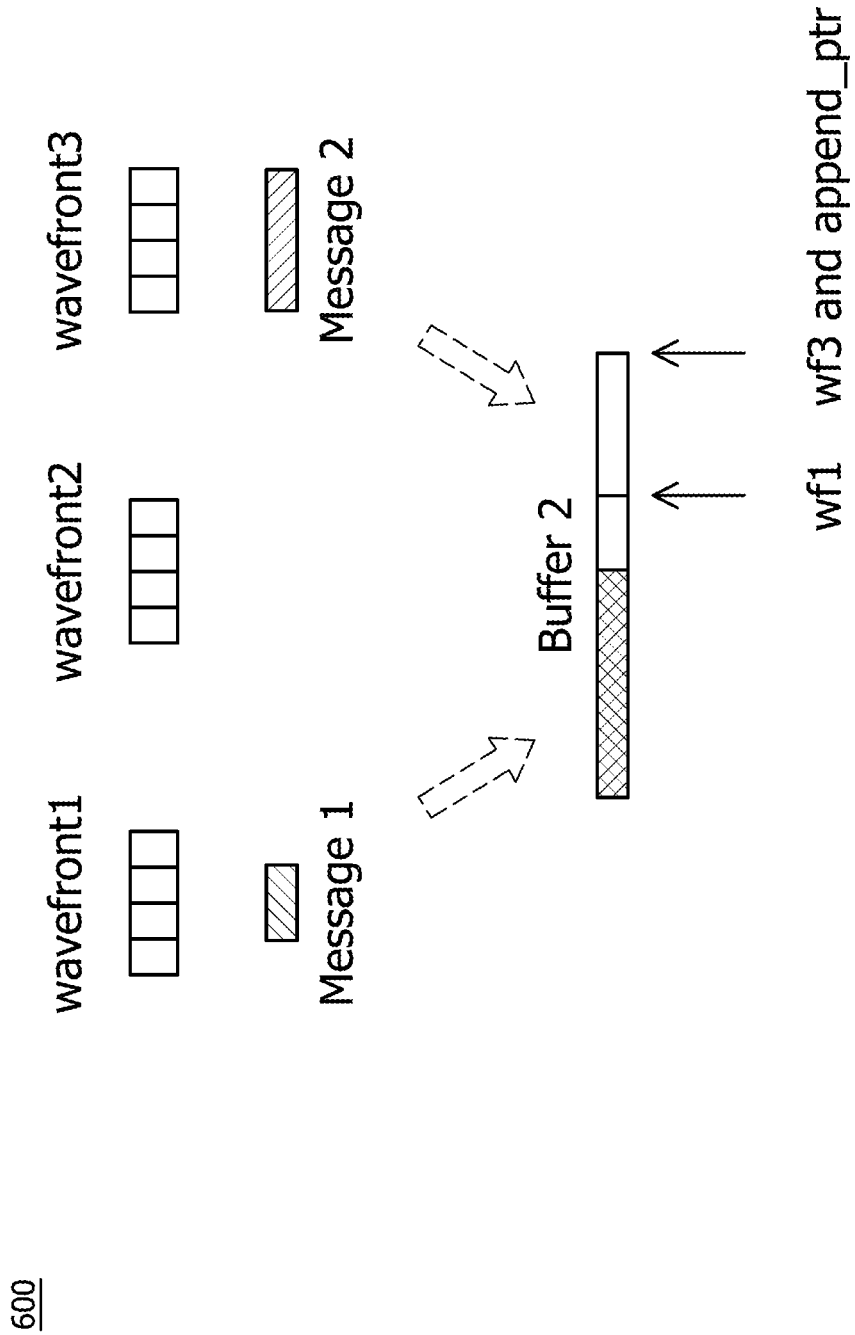
FIG. 6 is an illustration showing exemplary message passing between the plurality of wavefronts and storing of messages at destination buffers using updating of end portions and message sizes according to message based communications described herein.

As described herein with reference to FIG. 5 and FIG. 6, in some implementations, each of the messages (message 1 and message 2) are appended or added to an end (identified by append_ptr) of the wavefront buffer 2. Messages may be appended to other segments of a wavefront buffer, however, such as a segment between beginning and end of a wavefront buffer. When a message is consumed (e.g., read, executed) by a destination wavefront, the segment of a buffer storing the message may be made available for storing future messages or removed (e.g., deleted) from the buffer for storing future messages.

FIG. 6 is an illustration 600 showing exemplary message passing between the plurality of wavefronts (wavefront 1, wavefront 2 and wavefront 3) and storing of messages at destination buffers using updating of end portions and message sizes.

As shown in FIG. 6, wavefront 1 sends message 1 to wavefront buffer 2 and wavefront 3 also sends a message 2 to wavefront buffer 2. An exemplary function may be used by each source wavefront 1 and 2 to send their corresponding messages to destination wavefront 2. For example, a sending function, such as "void send_msg(src, numbytes, dst_wave_front_id)" may be used by each source wavefront (e.g., wavefront 1 and wavefront 3) to send the messages. In the exemplary sending function, "src" indicates an initial address of the source wavefront buffer (e.g., buffer 1) allocated to source wavefront (e.g., wavefront 1) and "numbytes" indicates a size (e.g., specified by a number of bytes) of a portion of data (e.g., message 1) in the source wavefront buffer being sent by the source wavefront. The source wavefront (e.g., wavefront 1) may send the portion of data (src, src+numbytes) to the destination wavefront having a corresponding destination wavefront identifier (e.g., wavefront 2), indicated by "dst_wave_front_id." The size of the reserved segment of buffer 2 may then be determined by the size (e.g., numbytes) of the portion of data specified in the sending function.

Wavefront buffer 2 may receive the message 1 from wavefront 1. For example, an exemplary receiving function, such as "receive_msg(dst, src_wavefront_id)" may be used by the destination wavefront (e.g., wavefront 2) to receive the message from the source wavefront having a corresponding source wavefront identifier (e.g., wavefront 1), indicated by src_wavefront_id." In this exemplary receiving function, the pointer to wavefront buffer 2 is "dst" and the function returns the number of bytes received from the source wavefront 1.

The end (e.g., append_ptr shown in FIG. 5) of buffer 2 allocated to wavefront 2 may be determined. For example, a work item of wavefront 1 may fetch the append_ptr to reserve a space atomically to store message 1 at destination wavefront buffer 2. Message 1 may then be stored at the segment which begins at the append_ptr of buffer 2. The end of the portion of memory may be updated (e.g., by wavefront 1) as wf1 (shown in FIG. 6) based on the append_ptr of buffer 2 and the size (e.g., specified by a number of bytes) of the message 1.

Wavefront buffer 2 may receive message 2 from wavefront 3 and the updated end "wf1" of buffer 2 may be determined. Message 2 may then be stored at the segment which begins at the updated end "wf1" of buffer 2. The updated end "wf1" of buffer 2 may also updated (e.g., by wavefront 3) as wf3 and append_ptr (shown in FIG. 6) based on the updated end "wf1" and the size (e.g., specified by a number of bytes) of the message 3.

When a space is reserved, a source wavefront may push its message into the destination wavefront buffer. The data movement of a message may be executed in parallel by different work items with each work item moving a set of data elements in the message. Loads and stores may also be coalesced.

Identification information may be maintained (e.g., in a table, such as Table 1 shown below) for each destination wavefront identifying: which source wavefronts sent messages (e.g., store messages in destination wavefront buffer) to the destination wavefront; where messages are stored in the destination wavefront portion of memory (e.g., offset, such as base offset and updated offset in destination memory buffer); and a size (e.g., number of bits, bytes or other units) of the messages.

TABLE 1

| Wavefront_ID | Offset (base_offset = 64) Actual ptr = base_offset + offset | Number of bytes |
| --- | --- | --- |
| . . . | . . . | . . . |
| 1 | 64 | 128 |
| 3 | 192 | 256 |
| . . . | . . . | . . . |

Exemplary Table 1 includes information corresponding to messages stored in wavefront buffer 2 used by destination wavefront 2. As shown, Table 1 includes: data identifying each group of work items (Wavefront_ID) sending messages to destination wavefront buffer 2; data identifying each corresponding segment (beginning at Actual_ptr) of the portion of memory allocated to the wavefront 2; and data identifying the size (Number of bytes) of each message stored at the corresponding segment.

Table 1 includes data identifying: (i) the first group of work items (e.g., "1" in Wavefront_ID column 1) sending the first message, the first segment (beginning at Actual_ptr=base_offset '64'+offset 0=64) in wavefront buffer 2 and the size (128 bytes) of the first message stored at the first segment; and (ii) data identifying the third group of work items (e.g., "3" in Wavefront_ID column 1) sending the second message, the second segment (beginning at Actual_ptr=base_offset '64'+offset 128=192) in the portion and the size (256 bytes) of the second message ("3") stored at the second segment.

The identification information may also be stored in the portion (e.g., destination memory buffer 2) of memory allocated to destination groups of work items (e.g., destination wavefront 2). The identification data may also be stored in portions of memory separate from the portions of memory allocated to destination groups of work items. Exemplary tables may be transparent to users. Exemplary identification information may be used by a receive_msg( ) function to identify and return a message (e.g., message 1, message 3) sent from a corresponding source wavefront (e.g., wavefront 1, wavefront 3).

Barriers, such as workgroup barriers or global barriers, may be used to synchronize operations, which may be provided at runtime or by the compiler. For example, a barrier may be used such that data (e.g., messages) sent from each sending buffer allocated to senders (e.g., wavefront 1 and wavefront 3 in the example described above with regard to FIGS. 5 and 6) is transferred to a receiving buffer allocated to a receiver (e.g., wavefront 2 in the example described above with regard to FIGS. 5 and 6), before the receiver begins consuming data from its receiving buffer with ready data from each sender.

Barriers may also be used to prevent a message from being received by a second sender (e.g., second source wavefront) until a message from a first sender (e.g., first source wavefront) is received, which may prevent two senders from simultaneously updating a receiving buffer. These barriers may be provided serially (e.g., a barrier after each sending function). These barriers may also be provided in parallel (e.g., a barrier after multiple sending functions), for example, if the sending functions provide mutual exclusion when updating the end (e.g., append ptr) of the receiving buffer (e.g., using atomic operations or locks).

For message-passing between wavefronts within a workgroup, a workgroup barrier may be provided (e.g., after a send_msg( ) function is called) to synchronize wavefronts within the workgroup. For example, when a workgroup having multiple wavefronts is dispatched to an accelerated processor core (e.g., GPU SIMD core), each wavefront may execute on the same core and share the same memory allocated to the core (e.g., L1 cache).

For message-passing between wavefronts across different workgroups, a global barrier may be provided (e.g., after a send_msg( ) function is called). Different workgroups may be dispatched on the same core or different cores. For example, when different workgroups execute on different cores, the wavefronts of the different workgroups may communicate with each other using a memory (e.g., L2 cache) shared by multiple cores or shared by each core of the accelerated processor (e.g., GPU). Wavefronts of a workgroup may synchronize with wavefronts of another workgroup via a GPU global barrier.

Other types of barriers may also be used depending on different scopes. For example, a barrier across a CPU and a GPU may be used to synchronize workgroups and/or wavefronts between the CPU and the GPU. Different barrier types may be used for optimizing efficiency and locality (e.g., barriers may trigger different cache operations depending on whether wavefronts may reside on the same or multiple cores). Persistent workgroups may also be used.

Methods may also include determining whether wavefronts belong to the same workgroup and determining whether wavefronts belong to different workgroups, such as for example, using wavefront identifiers and workgroup sizes.

Figure 7:
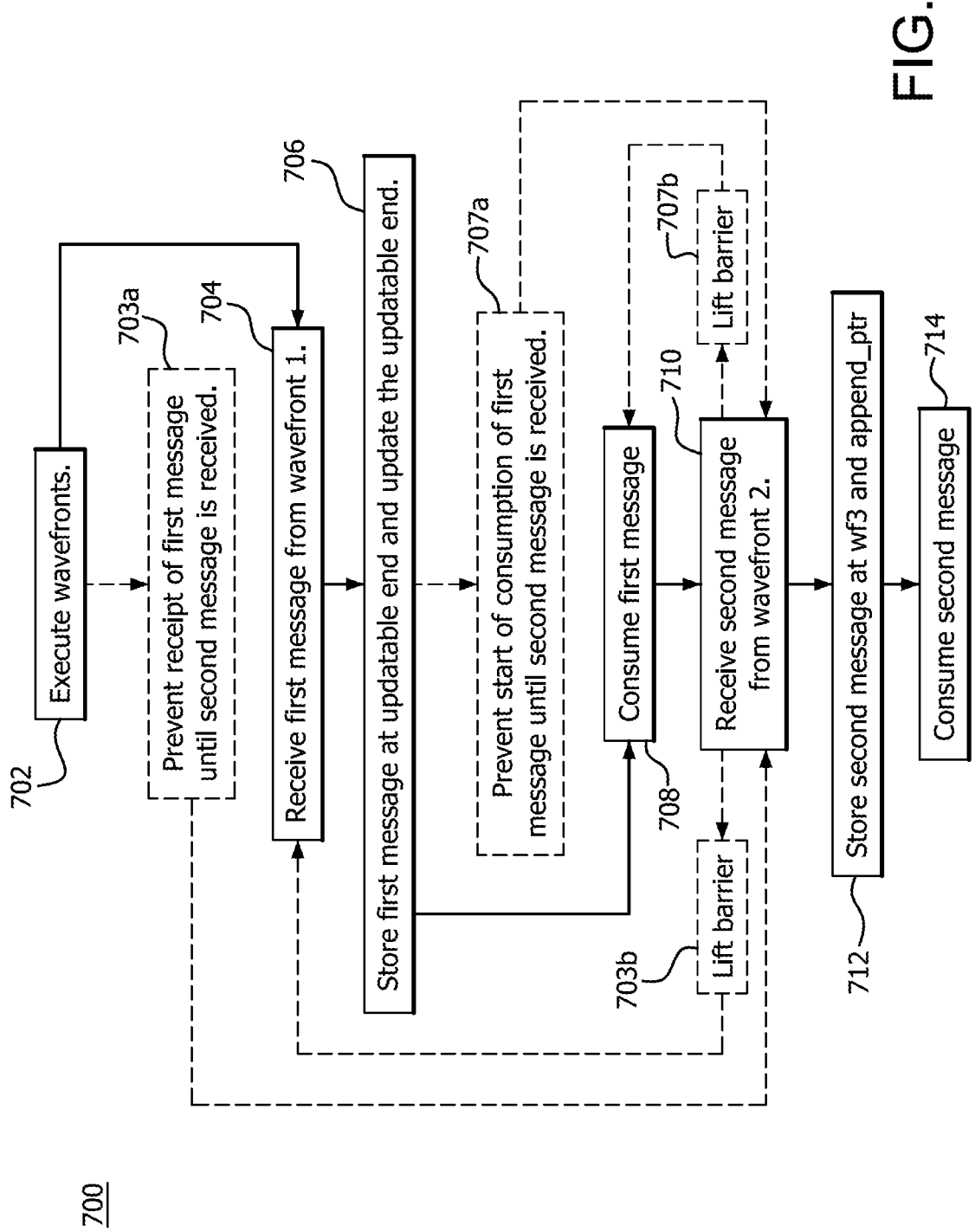
FIG. 7 is a flow chart illustrating an exemplary method of message-based communication.

FIG. 7 is a flow chart illustrating an exemplary method 700 of message-based communication. As shown in block 702 of FIG. 7, the method 700 may include executing a plurality of groups of work items (e.g., wavefronts 1-3 shown in FIG. 4-FIG. 6) on one or more accelerated processing units.

As shown at block 704, a first message (e.g., message 1 in FIG. 4-FIG. 6) may be received from a first group of work items (e.g., wavefront 1). As shown in block 706 of FIG. 7, the method 700 may include storing the first message at a first segment of memory (e.g., buffer 2 shown in FIG. 5 and FIG. 6) allocated to a second group of work items (e.g., wavefront 2). The first message may be stored at the beginning of an updatable end (e.g., append_ptr shown in FIG. 5). The updatable end may be updated as a first updated end (e.g., wf1) based on the updatable end and a size of the first message. As shown in block 708 of FIG. 7, workgroup 2 may begin consuming the first message stored in buffer 2.

As shown in block 710 of FIG. 7, the method 700 may include receiving a second message (e.g., message 2 shown in FIG. 5 and FIG. 6) from a portion of memory allocated to a third group of work items (e.g., wavefront 3). Although FIG. 7 illustrates the first message received prior to the second message, the first and second message may also be received simultaneously.

As shown in block 712 of FIG. 7, the method 700 may include storing the second message at the beginning at the first updated end wf1. The first updated end may be updated as a second updated end (e.g., wf3 and append_ptr shown in FIG. 6) based on the first updated end wf1 and a size of the second message. As shown in block 714 of FIG. 7, workgroup 2 may begin consuming the second message stored in buffer 2.

One or more barriers may be provided to facilitate synchronization of data. Blocks of the method 700 implementing the barriers are shown in phantom. The barriers may be provided serially (e.g., a barrier may be provided after each sending function). For example, the first barrier provided at block 703*a* may occur after the first message is sent from wavefront 1, but prior to the second message being sent and the second barrier provided at block 707*a* may be provided after the second message is sent from wavefront 2. Barriers may also be provided in parallel (e.g., after multiple sending functions). For example, the first barrier provided at block 703*a* and the second barrier provided at block 707*a* may be provided after both the first and second messages are sent from their respective wavefronts. The steps of sending of the messages are not shown in FIG. 7 for simplification purposes. It may be understood, however, that the first message may be sent at any time between block 702 and 704 and the second message may be sent at any time between block 702 and block 710.

As shown in FIG. 7, the first barrier may be provided at block 703*a* to prevent the first message from being received at buffer 2 until the second message is received at buffer 2 at block 710. When the second message is received at block 710, the barrier is lifted at lock 703*b* and the first message may be received at block 704.

As further shown in FIG. 7, the second barrier may be provided at block 707*a* to prevent the beginning of consumption of the first message until the second message is received at buffer 2 at block 710. When the second message is received at block 710, the barrier is lifted at lock 707*b* and the first message may be consumed at block 708.

As described above, a barrier may be a workgroup barrier when the groups of work items are wavefronts within the same workgroup. A barrier may also be a global barrier when the groups of work items are wavefronts in different workgroups sharing the same global memory.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements message based communications.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of message-based communication that improves memory utilization, the method comprising:
    executing, on one or more accelerated processing units, groups of work items each being allocated one of a plurality of memory portions;
    receiving, at a second memory portion allocated to a second group of work items, a first message from a first group of work items to reserve a first segment of the second memory portion;
    appending, by a first data size, the second memory portion to include the first segment;
    storing first data, from a first memory portion allocated to the first group of work items, at the first segment of the second memory portion allocated to the second group of work items;
    receiving, at the second memory portion allocated to the second group of work items after receiving the first message, a second message from a third group of work items to reserve a second segment of the second memory portion;
    appending, by a second data size, the second memory portion to include the second segment together with the first segment in the second memory portion;
    storing second data, from a third memory portion allocated to the third group of work items, at the second segment of the second memory portion; and
    providing at least one of:
    a barrier to prevent the receiving of the first message until the second message is received; and
    a barrier to prevent consuming of the first message until the second message is received.

2. The method of claim 1, further comprising:
    determining an updatable end of the second memory portion allocated to the second group of work items;
    storing, at the first segment, the first message beginning at the updatable end of the second memory portion allocated to the second group of work items; and
    updating the updatable end of the second memory portion as a first updated end based on the updatable end and a size of the first message.

3. The method of claim 2, further comprising:
    determining, by the second group of work items, the first updated end of the second memory portion allocated to the second group of work items;
    storing, at a second segment of the second memory portion allocated to the second group of work items, the second message beginning at the first updated end; and
    updating the first updated end of the second memory portion as a second updated end based on the first updated end and a size of the second message.

4. The method of claim 3,
    wherein the first message comprises information identifying the first group of work items sending the first message, an address in the first memory portion and the first data size of the first data; and the second message comprises information identifying the third group of work items sending the second message, an address in the third memory portion, and the second data size of the second data.

5. The method of claim 3, further comprising:
    determining the updatable end of the memory portion by fetching the updatable end of the second memory portion allocated to the second group of work items;
    reserving the first segment based on the updatable end of the second memory portion and the size of the first data; and
    storing the first data at the reserved first segment.

6. The method of claim 3, further comprising at least one of:
    preventing the first message or the second message from being consumed by the second group of work items until the first message and second messages are received at the first segment; and
    preventing the second memory portion from receiving one of the first message and the second message until the other of the first message and the second message is also received at the second memory portion.

7. The method of claim 6, wherein the first group of work items, the second group of work items and third group of work items are wavefronts, and
    each of the first group of work items, the second group of work items and third group of work items are at least one of: (i) wavefronts within the same workgroup; and (ii) wavefronts in different workgroups sharing the same global memory.

8. The method of claim 1, wherein each of the memory portions is used to store one or more messages sent from one or more other of the groups of work items.

9. A processor device that improves memory utilization, the processor device comprising:
    one or more accelerated processing units executing work item groups each comprising a plurality of work items; and
    memory having memory portions each allocated to one of the work item groups,
    wherein the one or more accelerated processing units are configured to cause:

a first message, from a first work item group, to be received at a second memory portion, allocated to a second work item group, to reserve the first segment of the memory portion;

the second memory portion to be appended by a first data size, to include the first segment;

first data from a first memory portion allocated to the first work item group to be stored at the first segment of the second memory portion;

after the first message is received, a second message from a third work item group to be received at the second memory portion to reserve a second segment of the second memory portion; and the second memory portion to be appended by a second data size to include the second segment together with the first segment in the second memory portion;

second data from a third memory portion allocated to the third work item group to be stored at the second segment; and at least one of:

a barrier to prevent the receiving of the first message until the second message is received; and a barrier to prevent consuming of the first message until the second message is received.

10. The processor device of claim 9, wherein the one or more accelerated processing units are configured to:

determine an updatable end of the second memory portion allocated to the second work item group;

store, at the first segment, the first message beginning at the updatable end of the second memory portion allocated to the second work item group; and update the updatable end of the second memory portion as a first updated end based on the updatable end of the second memory portion and a size of the first message.

11. The processor device of claim 10, wherein the one or more accelerated processing units are configured to:

receive a second message from the third work item group executing on the one or more accelerated processing units;

determine the first updated end of the second memory portion;

store, at a second segment of the second memory portion, the second message beginning at the first updated end; and update the first updated end of the second memory portion as a second updated end based on the first updated end of the second memory portion and the second data size of the second data.

12. The processor device of claim 11, wherein the first message comprises information identifying: (i) the first work item group sending the first message, segment in an address at the first memory portion and the first data size of the first data; and the second message comprises information identifying the third group of work items sending the second message, an address in the third memory portion and the data size of the second data.

13. The processor device of claim 11, wherein the one or more accelerated processing units are further configured to:

determine the updatable end of the second memory portion by fetching the updatable end of the first memory portion;

reserve the first segment based on the updatable end of the second memory portion and the size of the first data; and store the first data at the reserved first segment.

14. The processor device of claim 11, wherein the one or more accelerated processing units are further configured to at least one of:

prevent the first message or the second message from being consumed by the second group of work items until the first message and second messages are received; and prevent the receiving of one of the first message and the second message until the other of the first message and the second message is also received.

15. The processor device of claim 14, wherein the first group of work items, the second group of work items and third group of work items are wavefronts, and each of the first group of work items, the second group of work items and third group of work items are at least one of: (i) wavefronts within the same workgroup; and (ii) wavefronts in different workgroups sharing the same global memory.

16. A tangible, non-transitory computer readable medium comprising instructions for causing a computer to execute a method of message-based communication that improves memory utilization, the instructions comprising:

executing, on one or more accelerated processing units, groups of work items each being allocated one of a plurality of memory portions;

receiving, at a second memory portion allocated to a second group of work items, a first message from a first group of work items to reserve a first segment of the second memory portion;

appending, by a first data size, the second memory portion to include the first segment;

storing first data from a first memory portion allocated to the first group of work items, at the first segment of the second memory portion allocated to the second group of work items;

receiving, at the second memory portion allocated to the second group of work items after receiving the first message, a second message from a third group of work items to reserve a second segment of the second memory portion; and appending, by a second data size, the second memory portion to include the second segment together with the first segment in the second memory portion;

storing second data, from a third memory portion allocated to the third group of work items, at the second segment of the second memory portion; and providing at least one of:

a barrier to prevent the receiving of the first message until the second message is received; and a barrier to prevent consuming of the first message until the second message is received.

17. The computer readable medium of claim 16, the instructions further comprising:

determining an updatable end of the second memory portion allocated to the second group of work items;

storing, at the first segment, the first message beginning at the updatable end of the second memory portion allocated to the second group of work items; and updating the updatable end of the second memory portion as a first updated end based on the updatable end and a size of the first message.

18. The computer readable medium of claim 17, the instructions further comprising:

determining, by the second group of work items, the first updated end of the second memory portion allocated to the second group of work items;

storing, at a second segment of the second memory portion allocated to the second group of work items, the second message beginning at the first updated end; and updating the first updated end of the second memory portion as a second updated end based on the first updated end and a size of the second message.

\* \* \* \* \*